(12) United States Patent
Modlinger et al.

(10) Patent No.: US 7,677,676 B2
(45) Date of Patent: Mar. 16, 2010

(54) VEHICLE WHEEL FOR A DOUBLE-TRACK VEHICLE OR COVER THEREFOR

(75) Inventors: Florian Modlinger, Ried (DE); Rainer Demuth, Munich (DE); Sven Klussmann, Eichenau (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/972,242

(22) Filed: Jan. 10, 2008

(65) Prior Publication Data

US 2009/0179480 A1    Jul. 16, 2009

(51) Int. Cl.
  B60B 19/00  (2006.01)
  B60B 7/02   (2006.01)
  B60B 1/00   (2006.01)
(52) U.S. Cl. ............... 301/6.3; 301/37.101; 301/64.102
(58) Field of Classification Search ............ 301/6.3, 301/37.101, 63.101, 64.101, 64.102, 64.704, 301/64.705, 65, 5.309; D12/204, 209, 211
See application file for complete search history.

(56) References Cited

U.S. PATENT DOCUMENTS

| | | | |
|---|---|---|---|
| 5,100,206 A | | 3/1992 | Feng |
| D377,640 S | * | 1/1997 | Neeper ................ D12/209 |
| D390,822 S | * | 2/1998 | Neeper ................ D12/209 |
| D416,844 S | * | 11/1999 | Neeper ................ D12/209 |
| D497,139 S | * | 10/2004 | Anderson et al. ........ D12/209 |

FOREIGN PATENT DOCUMENTS

| | | |
|---|---|---|
| AT | 147 864 B | 11/1935 |
| DE | 42 31 082 A1 | 3/1994 |
| DE | 203 13 023 U1 | 12/2003 |

OTHER PUBLICATIONS

German Search Report dated Nov. 14, 2007 with English translation (Nine (9) Pages).

* cited by examiner

*Primary Examiner*—S. Joseph Morano
*Assistant Examiner*—Kip T Kotter
(74) *Attorney, Agent, or Firm*—Crowell & Moring LLP

(57) ABSTRACT

A vehicle wheel for a double-track vehicle or an external cover therefor is provided, having passage openings, particularly for a cooling air flow for a wheel brake provided on the interior side of the wheel, in the lateral projection. The passage openings have a width in the radial direction which changes when viewed in the circumferential direction such that, viewed against the rotating direction of the wheel when the vehicle is driving forward, the above-mentioned width Viewed in the radial direction, centers of the virtual segments of the passage opening which follow one another against the rotating direction move in the direction of the wheel center. As a result, the force as well as the lever arm of the drag is reduced, so that a moment of resistance is obtained which is significantly decreased. The passage openings are preferably bounded by spokes extending essentially in the radial direction.

9 Claims, 2 Drawing Sheets

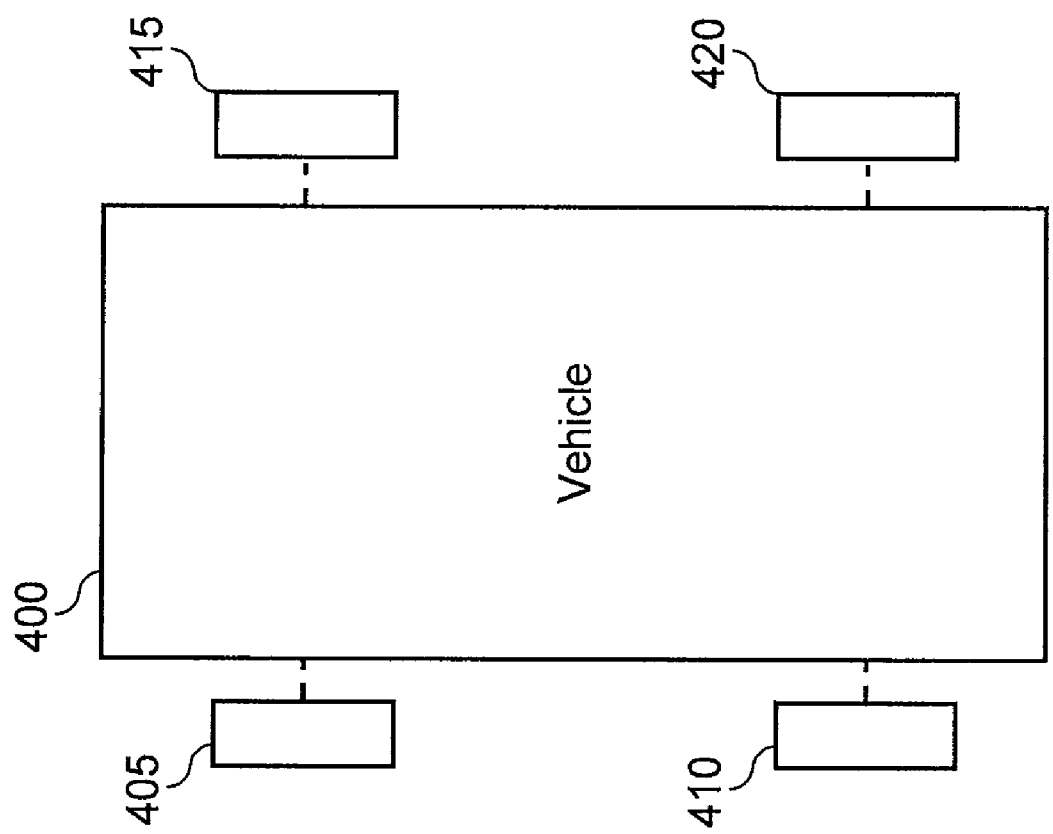

VEHICLE WHEEL FOR A DOUBLE-TRACK VEHICLE OR COVER THEREFOR

BACKGROUND AND SUMMARY OF THE INVENTION

The invention relates to a vehicle wheel for a double-track vehicle or an external cover therefor, having passage openings, particularly for a cooling air flow for a wheel brake provided on the interior side of the wheel, in the lateral projection. The passage openings have a width in the radial direction, which changes when viewed in the rotating direction of the wheel. With respect to the technical environment, reference is made by way of example only to German patent document DE 42 31 082 A1.

Measures for reducing drag, particularly at higher driving speeds, are becoming increasingly significant on two-track vehicles. In this case, the term "drag reduction" should be understood in the broadest sense. Here, it is a priority to search for measures which reduce the fuel consumption particularly on free-moving motor vehicles. With respect to the above, the vehicle wheels or their influence on the drag also should be considered, in which case a full-surface lateral cover of the wheel house (or at least of the wheel) would naturally be the best. However, on the other hand, a cooling air flow for a wheel brake provided on the interior side of the wheel has to be guaranteed. Accordingly, passage openings in the wheel disk, or a cover mounted on the latter or, in the case of a spoke wheel, between these spokes, as a rule, cannot be eliminated. In principle, it is known in this case to design these passage openings while taking into account flow dynamics such that a favorable above-mentioned cooling air flow can occur. For this purpose, the passage openings may, in the lateral projection, have a changing width in the radial direction when viewed in the rotating direction of the wheel.

A further improvement with respect to a vehicle wheel or a cover therefor, of the above-mentioned type is provided by which, in the broadest sense, a reduction of the drag can be achieved.

The solution of this task is characterized in that, viewed against the rotating direction of the wheel when the vehicle is traveling forward, the above-mentioned width decreases, and in that the centers, viewed in the radial direction, of the virtual segments of the passage opening following one another against the rotating direction move virtually in the direction of the wheel center. In this case, the passage openings may preferably be bounded by spokes extending essentially in the radial direction.

Although this suggested measure does not directly reduce the drag but rather the moment of resistance directed against a wheel rotation and resulting from aerodynamic forces and the wheel rotation, as will be explained in detail below, this measure leads to a measurable reduction of the fuel consumption.

BRIEF DESCRIPTION OF THE DRAWINGS

FIG. 4 is a simplified block diagram of a double-track vehicle.

DETAILED DESCRIPTION OF THE DRAWINGS

Figure 1:
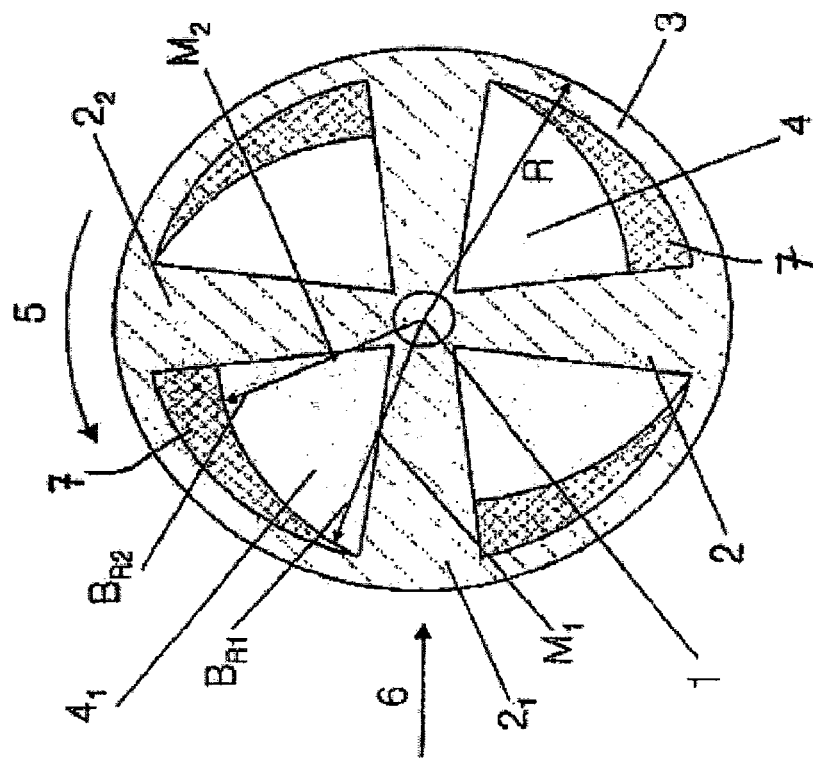
FIG. 1 is a schematic diagram of a vehicle wheel according to the present invention.

The schematic diagram of FIG. 1, which naturally does not have the purpose of limiting any embodiment, is a simplified lateral view from the outside of a vehicle wheel or an external wheel cover for explaining the principle according to the invention; that is, a wheel brake (in a manner known to a person skilled in the art), which is not visible here, is situated behind the wheel or interior of an outer plane of the wheel. The center of this wheel has the reference number 1. In this case, four spokes 2 extend from this center 1, which spokes 2 here have a cross-section which increases in the radial direction R, to the wheel rim 3, on which a tire, which is not shown, can then be mounted or is disposed. Between two mutually adjacent spokes 2, a (here, relatively large) passage opening 4 is (therefore) situated, through which passage opening 4, for example, a cooling air flow can pass approximately perpendicularly to the plane of projection between the spokes 2. The rotating direction of this vehicle wheel in the case of a forward-moving vehicle is illustrated by the arrow 5.

As illustrated, the width $B_{Ri}$ of the passage opening(s) 4 measured in the radial direction decreases viewed against the rotating direction; that is, the width $B_{R1}$ of the passage opening $4_1$ between the spokes $2_1$ and $2_2$ close to the spoke $2_1$, which is forward viewed in the rotating direction 5, is greater than the width $B_{R2}$ measured in this lateral projection in the radial direction R close to the spoke $2_2$, which is rearward viewed in the rotating direction 5. For this purpose, a flat crescent-shaped additional element 7 is provided in each passage opening 4 on the interior side of the wheel rim 3 facing the center 1, which interior side, viewed here in the radial direction R, has a constant width. The surface of the additional element 7 in the wheel plane increases viewed against the rotation direction 5, but the resulting design of the passage openings 4 can also be achieved in a different manner.

Figure 2:
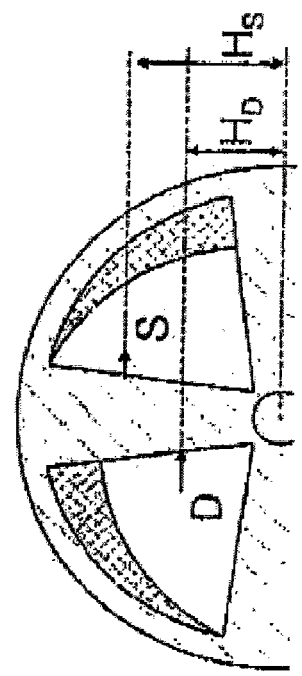
FIG. 2 is a schematic diagram illustrating the top half of the vehicle wheel of FIG. 1.
Figure 3:
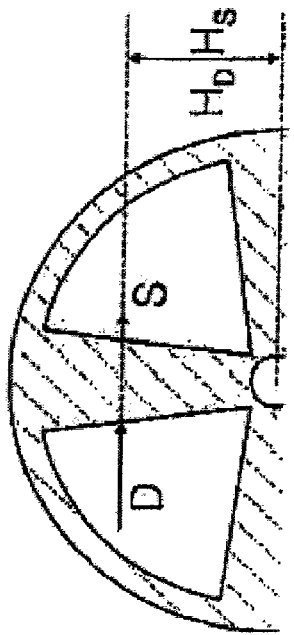
FIG. 3 is a schematic diagram corresponding to FIG. 2 according to the state of the art.

By means of this measure, the attack surface at the spoke $2_2$ is reduced for a pressure force D, which is inhibiting because it increases the drag and which occurs from the air flow against the wheel according to arrow 6 when the vehicle moves in the driving direction (=against arrow 6), as illustrated particularly by a comparison of FIGS. 2 and 3. In this case, FIG. 2 shows the top half of the wheel of FIG. 1, while FIG. 3, in a corresponding representation, shows the most wide-spread state of the art according to which the width of the passage openings 4 measured in the radial direction R and viewed over the wheel rotating direction is unchanged. The comparison of these two FIGS. 2, 3 also clearly illustrates that the lever arm $H_D$ of this pressure force D with respect to the center 1 is considerably reduced by means of the measure according to the invention, which therefore results in a reduced moment of resistance (against a wheel rotation).

This measure causes essentially no change of the less inhibiting suction force S on the rear of the rearward spoke $2_2$ facing away from the flow 6, since the passage opening 4 again has the width $B_{R1}$ there, and the lever arm $H_S$ of the suction force S therefore remains unchanged. Naturally, with a view to minimizing the above-mentioned moment of resistance, it would make sense to also reduce the lever arm $H_S$ of the suction force S but this would then result in a smaller-surface passage opening 4, which would, for example, cause an insufficient cooling air flow through the wheel.

As a result of the embodiment according to the invention, viewed virtually against the rotating direction 5 of the wheel, the—viewed in the radial direction R—centers $M_i$ of the virtual segments of the passage opening 4, which follow one another against the rotating direction 5, move in the direction of the wheel center 1; that is, referring to only two such "virtual segments", the—viewed in the rotating direction 5—forward center $M_1$, viewed in the radial direction R, is situated farther outward radially than the center $M_2$ situated farther inward in the passage opening 4. As a result of this measure,—as mentioned in connection with FIG. 2—a reduced lever arm $H_D$ with respect to the wheel center 1 is obtained for the pressure force D applied to the forward side of the spoke $2_2$ facing the flow 6. This lever arm $H_D$ is particularly also less than the lever arm $H_S$, relating to the wheel center 1, of the suction force S applied to the above-mentioned rear of this spoke $2_2$. On the whole, these measures lead to a reduced moment of resistance with respect to the wheel center 1 resulting from the flow 6 and the wheel rotation.

For a further reduction of the drag, the spokes themselves may have a flow profile cross-section, as known, for example, from German patent document DE 89 12 607, but a number of details may have designs deviating from the above explanations without leaving the content of the claims.

FIG. 4 depicts a simplified block diagram of a vehicle 400. Vehicle 400 comprises a first set of wheels 405 and 410, and a second set of wheels 415 and 420. Wheels 405, 410, 415 and 420 each may include passage openings having a width in a radial direction that changes when viewed in a rotational direction of the vehicle wheel as disclosed herein.

The invention claimed is:

1. A vehicle wheel for a double-track vehicle, comprising:
one or more passage openings, bounded by spokes extending substantially in a radial direction of the wheel, for providing cooling air interiorly of the vehicle wheel, the one or more passage openings opening in a lateral projection of the vehicle wheel;
wherein the passage openings have a width in a radial direction that changes when viewed in a rotational direction of the vehicle wheel; and
wherein, when viewed against a forward driving rotating direction of the wheel, the width of the one or more passage openings decrease such that a lever arm of a pressure force, which lever arm is with respect to the axis of rotation, occurring from airflow against the wheel when the vehicle is moving in the driving direction is reduced, wherein the lever arm of said pressure force is less than a lever arm of a suction force in relation to the axis of rotation.

2. The vehicle wheel according to claim 1, wherein an attack surface of a spoke is reduced for the pressure force when the vehicle moves in the driving direction.

3. The vehicle wheel according to claim 1, wherein the width of each of said one or more passage openings of the vehicle wheel decreases when viewed against the forward driving rotating direction of the wheel.

4. An external cover for a vehicle wheel for a double-track vehicle, the cover comprising:
one or more passage openings, bounded by spokes extending substantially in a radial direction of the wheel cover, for providing cooling air interiorly of the vehicle wheel, the one or more passage openings opening in a lateral projection of the vehicle wheel;
wherein the passage openings have a width in a radial direction that changes when viewed in a rotational direction of the vehicle wheel; and
wherein, when viewed against a forward driving rotating direction of the wheel, the width of the one or more passage openings decrease such that a lever arm of a pressure force, which lever arm is with respect to the axis of rotation, occurring from airflow against the wheel when the vehicle is moving in the driving direction is reduced, wherein the lever arm of said pressure force is less than a lever arm of a suction force in relation to the axis of rotation.

5. The external cover according to claim 4, wherein an attack surface of a spoke is reduced for the pressure force when the vehicle moves in the driving direction.

6. The external cover according to claim 4, wherein the width of each of said one or more passage openings decreases when viewed against the forward driving rotating direction of the wheel.

7. A vehicle comprising:
a first set of wheels; and
a second set of wheels;
wherein each wheel of the first and second sets of wheels comprises one or more passage openings, bounded by spokes extending substantially in a radial direction of the wheel, for providing cooling air interiorly of the wheel, the one or more passage openings opening in a lateral projection of the wheel;
wherein the passage openings have a width in a radial direction that changes when viewed in a rotational direction of the vehicle wheel; and
wherein, when viewed against a forward driving rotating direction of the wheel, the width of the one or more passage openings decrease such that a lever arm of a pressure force, which lever arm is with respect to the axis of rotation, occurring from airflow against the wheel when the vehicle is moving in the driving direction is reduced, wherein the lever arm of said pressure force is less than a lever arm of a suction force in relation to the axis of rotation.

8. The vehicle according to claim 7, wherein an attack surface of a spoke is reduced for the pressure force when the vehicle moves in the driving direction.

9. The vehicle according to claim 7, wherein the width of each of said one or more passage openings of each vehicle wheel decreases when viewed against the forward driving rotating direction of the wheel.

* * * * *